Figure 1:
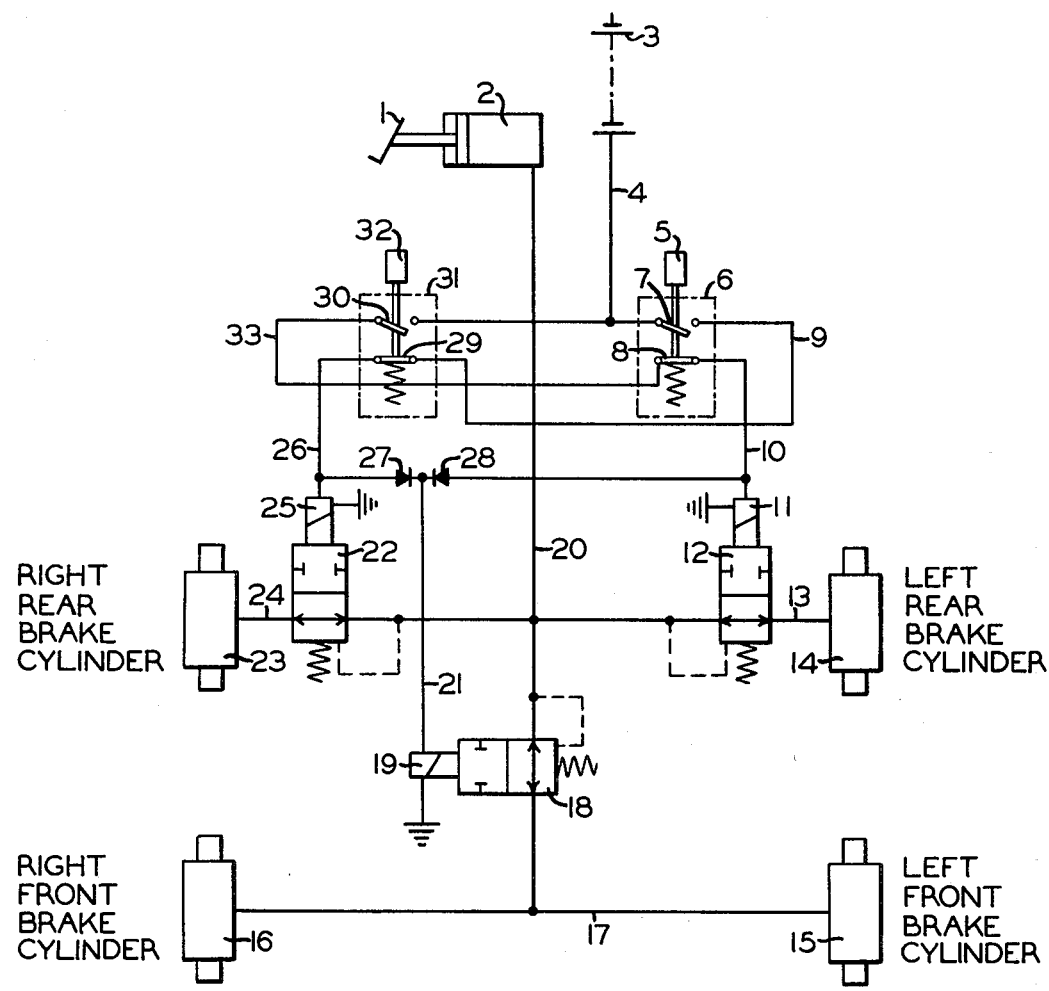

United States Patent [19]
Bartscher et al.

[11] Patent Number: 4,475,773
[45] Date of Patent: Oct. 9, 1984

[54] STEERING-BRAKE CONTROL ARRANGEMENT FOR A VEHICLE BRAKE SYSTEM

[75] Inventors: Peter Bartscher, Hanover; Harald Meyer, Garbsen; Diether Staisch, Walsrode, all of Fed. Rep. of Germany

[73] Assignee: WABCO Fahrzeugbremsen GmbH, Hanover, Fed. Rep. of Germany

[21] Appl. No.: 473,372

[22] Filed: Mar. 8, 1983

[30] Foreign Application Priority Data

Mar. 9, 1982 [DE] Fed. Rep. of Germany ....... 3208393

[51] Int. Cl.$^3$ .................... B60T 11/10; B62D 11/08
[52] U.S. Cl. .................... 303/6 A; 188/16; 188/354
[58] Field of Search .................... 303/6 A, 6 R, 52, 7, 303/8, 15, 20, 119; 188/16, 354, 345; 180/6.2; 244/111

[56] References Cited

U.S. PATENT DOCUMENTS

| | | | |
|---|---|---|---|
| 2,213,947 | 9/1940 | Bowen | 188/354 |
| 2,241,214 | 5/1941 | Milster | 188/354 |
| 2,741,337 | 4/1956 | Ziskal | 188/354 |
| 3,834,769 | 9/1974 | Just | 303/6 R |
| 3,863,991 | 2/1975 | Wilson | 303/6 A |
| 3,920,282 | 11/1975 | Devlieg | 303/6 R X |
| 4,236,759 | 12/1980 | Lysenko | 303/6 A |
| 4,274,680 | 6/1981 | Sieving et al. | 303/6 A |
| 4,402,478 | 9/1983 | Martin | 188/16 X |
| 4,407,547 | 10/1983 | Edwards | 303/6 A |

FOREIGN PATENT DOCUMENTS 1480204 4/1969 Fed. Rep. of Germany .

Primary Examiner—Douglas C. Butler
Attorney, Agent, or Firm—Gary J. Falce

[57] ABSTRACT

A steering-brake control system for a vehicle in which solenoid operated control valves associated with the respective wheels of at least one axle are normally maintained in an open position, so long as the valve solenoid operators are deenergized. Braking pressure is produced when either one of a right and left brake pedal is operated. Switches associated with each pedal are effective to energize the solenoid of one wheel control valve to cut off brake pressure to that particular wheel, so that only the one wheel corresponding to the operated brake pedal is braked to cause the vehicle to turn in that direction for steering control in off-street operation. In the event both brake pedals are operated, the switches and valves operate to admit brake pressure to each wheel brake cylinder for normal braking during on-street operation.

11 Claims, 2 Drawing Figures

STEERING-BRAKE CONTROL ARRANGEMENT FOR A VEHICLE BRAKE SYSTEM

BACKGROUND OF THE INVENTION

The present invention concerns a steering-brake control for a fluid pressure operated vehicle brake system in which operation of a left or right brake pedal independently of the other causes the vehicle to turn accordingly.

The control valves of a known steering-brake arrangement are each mechanically operable by means of a corresponding brake pedal, whereby they are kept closed in the free wheel condition of the vehicle.

The control valves mentioned are designed in a special way for utilization in the known steering-brake arrangement and the cost is accordingly high. Conventional switch valves are not usable for this purpose without modification.

SUMMARY OF THE INVENTION

The object of the invention is based on the task of improving the aforementioned steering-brake arrangement through the elimination of the specially designed control valves.

The invention—through electric control of the control valves—makes the use of commercial or other relatively simple magnetic valves possible. Due to the fact that the control valves, designed as magnetic valves, are not directly operated by means of brake pedals against the forces of return or closing springs, the foot-pressure of the vehicle operator can be utilized almost exclusively, and thus more efficiently, for the generation of the braking pressure.

Figure 2:
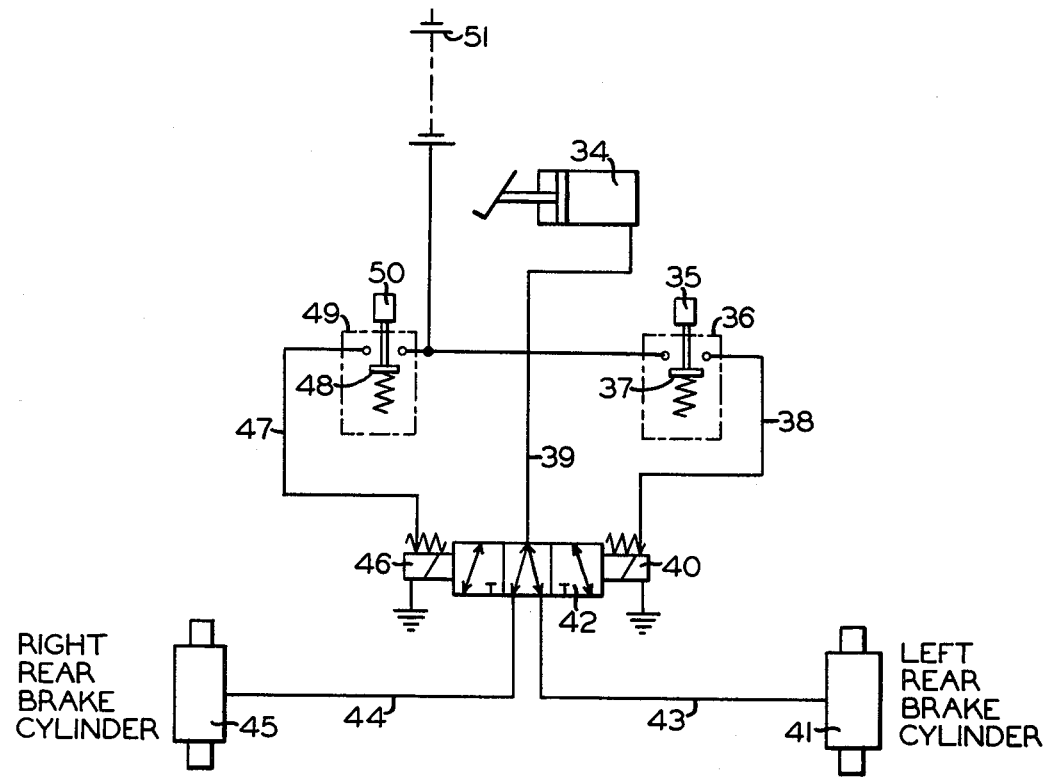

The invention is explained in more detail with reference to two operating examples in the drawing, wherein:

FIG. 1 shows an operating example with an additional control of the brake pressure with regard to the front axle; and FIG. 2 shows an operating example with a 3-position valve which forms both control valves.

In FIG. 1, a steering brake arrangement for a tractor with a hydraulic brake system is represented. To brake the rear or non-steering axle, a left rear wheel brake cylinder 14 and a right rear wheel brake cylinder 23 are provided; whereas to brake the front or steering axle, a left front wheel brake cylinder 15 and a right front wheel brake cylinder 16 are provided. To generate the hydraulic brake pressure, a master brake cylinder 2 is used which is connected with the left rear wheel brake cylinder 14 via a hydraulic brake line 20, a magnetic valve 12, and a brake line 13.

The master brake cylinder 2 is connected with the right rear wheel brake cylinder 23 via brake line 20, a further magnetic valve 22, and a brake line 24. The magnetic valves 12 and 22 are designed as two-way, two-position valves. The front wheel brake cylinders 15 and 16 are coupled with the brake line 20 by way of a magnetic valve 18, which also is designed as a two-way, two-position valve, and a brake line 17.

The three magnetic valves 12, 18 and 22, for reasons of safety, are arranged and designed in such a way that in a deenergized condition of their respective solenoid operators 11, 19 and 25, a fluid flow path is established from line 20 to the respective lines 13, 17 and 24.

The electrical control of solenoid operators 11, 19 and 25 is provided by two electrical switching devices 6 and 31, as well as an additional switching device 27. The switching device 6 contains two switches 7 and 8. Switch 7 is normally opened and switch 8 is normally closed in a current-conducting manner. Similarly, the switching device 31 contains two switches 30 and 29, the former being normally open and the latter being normally closed. By operating the switching devices 6 and 31, normally open switches 7 and 30 are closed to conduct current; whereas normally closed switches 8 and 29 are opened.

The power for the electric switching devices and the solenoid operators is provided by a power source 3. Solenoid operator 11 of the magnetic valve 12 is connected with the power source 3 via an electric line 10, normally closed switch 8 of switching device 6, normally open switch 30 of switching arrangement 31, and electric line 4. Also, the solenoid operator 25 of magnetic valve 22 is connected with the power source 3 via an electric line 26, normally closed switch 29 of switching device 31, an electric line 9, normally open switch 7 of switching arrangement 6, and electric line 4.

Solenoid operator 19 of magnetic valve 18, on one side, is connected to the electric line 10 via an electric line 21 and a diode 28, and on the other side, is connected via line 21 and a diode 27 to line 26. Diodes 27 and 28 are poled in such a manner that they decouple electric lines 10 and 26 and at the same time make possible an electric control of solenoid operator 19 via either line 10 or 26.

For the operation of the operating element 1 of the master brake cylinder 2 and the electric switching arrangements 6 and 31, two brake control levers, which may be in the form of brake pedals 5 and 32 are provided, which are selectively operable either jointly by locking the brake pedals together during normal street driving, or independently in an unlocked condition of the brake pedals for a steering-brake action. In joint as well as independent operation of the brake pedals 5 and 32, the operating element 1 of the master brake cylinder 2 is always actuated.

In case of joint operation of brake pedals 5 and 32 (normal street driving), all four wheel brake cylinders 14, 15, 16 and 23 are to be acted upon with hydraulic brake pressure. With a steering-brake action, however, the wheel brake cylinders 15 and 16 of the front axle are not to be acted upon with brake pressure, whereas in the case of the wheel brake cylinders 14 and 23 of the driven rear axle, only those wheel brake cylinders are to be acted upon with brake pressure in whose direction the vehicle is to be steered. These functions are carried out as follows:

In case of a joint operation of brake pedals 5 and 32, among other things, switches 8 and 29 are opened so that none of the solenoid operators 11, 19 and 25 can be energized. This means that the magnetic valves 12, 18 and 22 are in the position indicated and transmit the braking pressure which is generated with the master brake cylinder 2 to all wheel brake cylinders for normal street driving.

In the case of a steering-brake action, operation of brake pedal 5 will close normally open switch 7 in a current-conducting manner. Via the then closed switch 7 as well as the normally closed switch 29 of the unactuated switching device 31, the solenoid operator 25 of magnetic valve 22 is energized. The solenoid operator 11 of magnetic valve 12, however, remains deenergized.

As a consequence, the magnetic valve 22 is actuated to its closed position to cut off the supply of braking pressure from master brake cylinder 2 to the right rear wheel brake cylinder 23, while the left rear wheel brake cylinder 14 is concurrently supplied with braking pressure. At the same time, the solenoid operator 19 of magnetic valve 18 is actuated via the diode 27 so that then also the wheel brake cylinders 15 and 16 of the front axle are cut off from the brake pressure mentioned.

Accordingly, with operation of the single brake pedal 5, only the left rear wheel brake cylinder 14 is acted upon with brake pressure generated by the master brake cylinder 2, thereby producing a turning movement toward the left.

The brake mechanism shown in FIG. 1 can be expanded in an advantageous manner and without significant expenditure by way of an indication (brake light) concerning operation of at least one of the brake pedals 5 and 32. Hereby, it is essentially necessary to connect the two lines 9 and 33 with one another and utilize the thus created connection point for the supply or control of a brake light. A pressure controlled brake light mechanism generally used at this point is thus no longer necessary.

To the brake line 17 of the described brake system, an existing trailer brake system can be connected in an advantageous way. In this manner, the trailer brake system can then be controlled only when both of the rear axle wheels of the tractor are braking, that is, only then when no steering-brake action is present.

Also in FIG. 2, as a further operating example of the invention, a steering-brake system for a tractor with hydraulic brake action is shown. In comparison to the steering-brake system shown in FIG. 1, in FIG. 2 only the brake action of the rear axle is shown. Associated with this rear axle is a left rear wheel brake cylinder 41, as well as a right rear wheel brake cylinder 45.

The wheel brake cylinder 41 is connected with a hydraulic main brake cylinder 34—operable by means of an operating element 1—via a hydraulic brake line 43 and a 3-position valve 42 which is designed as a solenoid-operated three-way, three-position magnetic valve, as well as a hydraulic brake line 39. Wheel brake cylinder 45 is coupled with the main brake cylinder 34 via a hydraulic brake line 44, magnetic valve 42, and the brake line 39.

To operate magnetic valve 42, two solenoid operators 40 and 46 are provided which are arranged and designed in such a way that the magnetic valve 42 is in the represented center position when both solenoid operators 40 and 46 are actuated or not actuated. If only one of the solenoid operators 40 or 46 is actuated, the magnetic valve 42 is in one of the corresponding end positions.

The magnetic valve 42 with solenoid operators 40 and 46 described thus far, in connection with the steering-brake mechanism according to FIG. 2, takes over the same function as both of the magnetic valves 12 and 22 in the steering-brake mechanism of FIG. 1.

For electric control of the solenoid operators 40 and 46, two electric devices 36 and 49 are provided, each containing a normally open electric switch 37 and 48.

To operate switching device 36, a brake pedal 35 is provided, whereas to operate switching device 49, a brake pedal 50 is provided.

The supply of power for solenoid operators 40 and 46 is provided by a power source 51, which feeds an electric line 52, which in turn is connected on one side with the solenoid operator 40 via switch 37 and an electric line 38, and on the other side with the solenoid operator 46 via switch 48 and and electric line 47.

Both brake pedals 35 and 50, as well as the operating element 33 of the main brake cylinder 34, are arranged and designed to operate like brake pedals 5 and 32 and the operating element 1 in the steering-brake mechanism according to FIG. 1. At normal street driving, brake pedals 35 and 50 are operated jointly by means being locked together, whereas during a steering-brake action in each case only one of the brake pedals 35 or 50 is operated.

In a joint operation of the brake pedals 35 and 50, both switches 37 and 48 are closed and thus both solenoid operators 40 and 46 are actuated. Based on the design of the magnetic valve 42, as described above, the same then is in the center position as indicated. This results in the fact that the brake pressure generated by means of the main brake cylinder 34 is directed to the two wheel brake cylinders 41 and 45.

Operation of the one brake pedal 35 and operating element 1, causes solenoid operator 40 to be actuated by closure of switch 37, so that the magnet valve 42 is shifted to its left end position. In this position, the wheel brake cylinder 41 is connected to the brake pressure generated in the main brake cylinder 34, whereas the hydraulic brake line 44 and thus the wheel brake cylinder 45 is cut off from the aforementioned brake pressure. Accordingly, during operation of this single brake pedal 50, only wheel brake cylinder 45 is acted upon with brake pressure.

The magnet valve 42 can be modified advantageously in such a manner that, in the center position shown, it exhibits a third pressure medium outlet for the supply and operation of a trailer brake system. This is an easy way to assure that the trailer brake system is only operated when both wheels of the rear axle are braking, that is, when no steering-brake action is taking place.

Having now described the invention, what we claim as new and desire to secure by Letters Patent, is:

1. A steering-brake control system for a vehicle comprising:
    (a) right and left wheel brake cylinders of at least one axle of said vehicle;
    (b) a master cylinder providing a source of fluid pressure to effect operation of said wheel cylinders;
    (c) first valve means for normally establishing fluid pressure communication between said master cylinder and each of said right and left wheel brake cylinders in an actuated condition thereof, and for cutting off said fluid pressure communication with one of said left and right wheel brake cylinders in an actuated condition of said first valve means;
    (d) first and second switch means for establishing said actuated condition of said first valve means;
    (e) right and left brake pedals selectively arranged to operate either jointly or independently of each other and to concurrently operate said master cylinder, said right and left brake pedals being further arranged to operate respective ones of said first and second switch means, whereby operation of either one of said independently arranged brake pedals establishes said actuated condition of said first valve means; and
    (f) means for maintaining said first valve means in a deactuated condition when said right and left brake pedals are both operated.

2. A steering-brake control system as recited in claim 1, wherein said means for maintaining said first valve means in a deactuated condition comprises said first and second switch means each having a normally open switch member and a normally closed switch member, said normally open and normally closed switch members being jointly operable, said normally open switch member of each said first and second switch means being connected to said normally closed switch member of the other of said first and second switch means.

3. A steering-brake control system as recited in claim 2, wherein said first valve means comprises:
(a) a first two-position, two-way valve device between said master cylinder and said right wheel brake cylinder, said first valve device having a solenoid operator connected to a source of power via said normally open switch member of said second switch means and said normally closed switch member of said first switch means; and
(b) a second two-position, two-way valve device between said master cylinder and said left wheel brake cylinder, said second valve device having a solenoid operator connected to a source of power via said normally open switch member of said first switch means and said normally closed switch member of said second switch means.

4. A steering-brake control system as recited in claim 3, wherein said first and second valve devices are normally disposed in a first position in which said fluid pressure communication between said master cylinder and a respective one of said right and left wheel brake cylinders is established, said first and second valve devices being actuated to a second position in which said fluid pressure communication is cut off when said solenoid operator thereof is energized.

5. A steering-brake control system as recited in claim 1, wherein said at least one axle is the non-steering axle of said vehicle.

6. A steering-brake control system as recited in claim 1, wherein said means for maintaining said first valve means in a deactuated condition comprises:
(a) said first and second switch means each having a normally open switch member; and
(b) said first valve means being a three-position, three-way valve device having first and second solenoid operators connected to said source of power via said normally open switch member of said first and second switch means respectively, said three-position, three-way valve device having a first position in which fluid pressure communication between said master cylinder and a respective one of said right and left wheel brake cylinders is established when said first and second solenoid operators thereof are both energized.

7. A steering-brake control system as recited in claim 6, further characterized in that said three-position, three-way valve device is actuated to a second position in which said fluid pressure communication is cut off from said one wheel brake cylinder and connected to the other wheel brake cylinder in response to energization of said first solenoid operator, and is actuated to a third position in which said fluid pressure communication is cut off from said other wheel brake cylinder and connected to said one wheel brake cylinder in response to energization of said second solenoid operator.

8. A steering-brake control system as recited in claim 1, further comprising:
(a) right and left wheel brake cylinders of a further axle of said vehicle;
(b) further valve means for normally establishing fluid pressure communication between said master cylinder and said right and left wheel brake cylinders of said further axle; and
(c) further switch means via which said further valve means is actuated when said first valve means is actuated.

9. A steering-brake control system as recited in claim 8, wherein:
(a) said further switch means comprises a first and second diode interconnected at corresponding poles thereof and having the other pole connected to a respective one of said first and second switch means; and
(b) said further valve means comprises a third two-position, two-way valve device having a solenoid operator connected to said interconnection between said corresponding poles of said first and second diodes.

10. A steering-brake control system as recited in claim 9, wherein said third valve device is normally disposed in a first position in which said fluid pressure connection between said master cylinder and said right and left wheel brake cylinders of said further axle is established and is actuated to a second position in which said fluid pressure communication between said master cylinder and said right and left wheel brake cylinders of said further axle is cut off when said solenoid operator thereof is energized.

11. A steering-brake control system as recited in claim 8, wherein said further axle comprises the steering axle of said vehicle.

* * * * *